June 26, 1945.    H. KENNISON    2,379,160
PLANT ROOT INJECTOR
Filed June 29, 1944
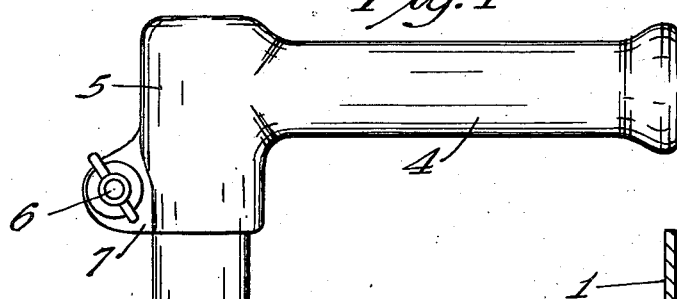
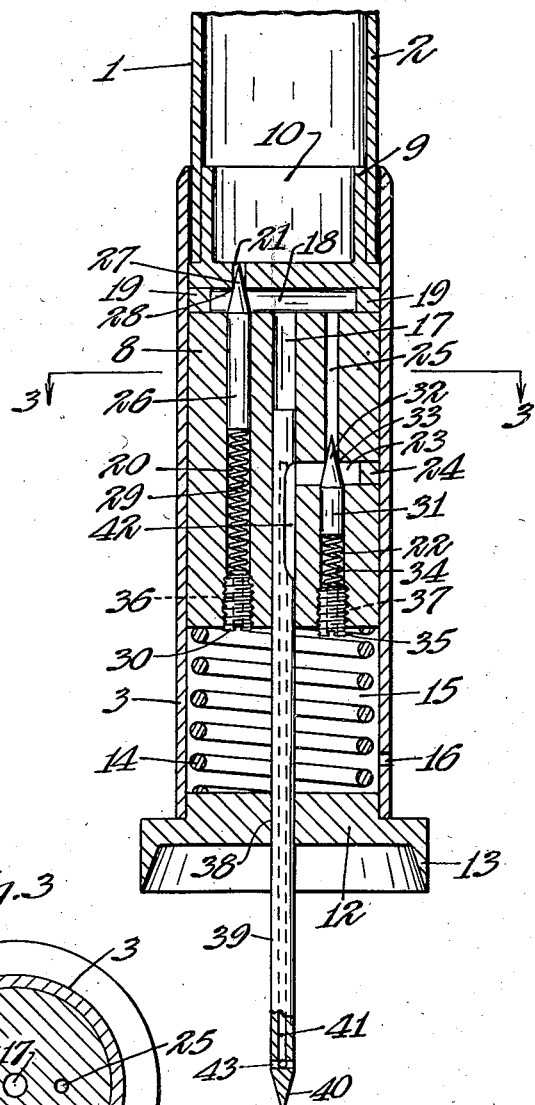
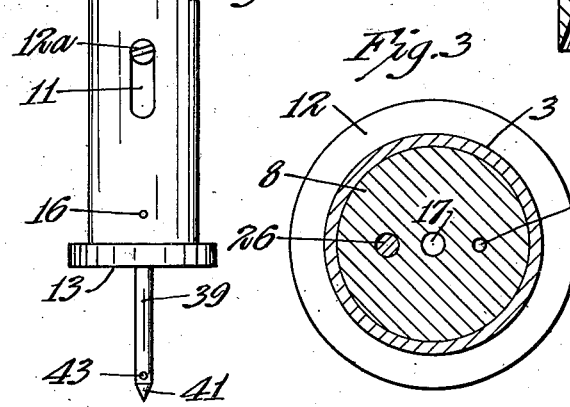
Inventor
Haven Kennison
By Merchant & Merchant
Attorneys Patented June 26, 1945

2,379,160

UNITED STATES PATENT OFFICE 2,379,160

PLANT ROOT INJECTOR

Haven Kennison, Minneapolis, Minn.

Application June 29, 1944, Serial No. 542,691

2 Claims. (Cl. 47—49)

My invention relates to injectors and more particularly to devices for injecting liquids into or near to the roots of weeds or other types of plant life.

The primary object of my invention is the provision of a device which can be used with equal effectiveness in both exterminating and fertilizing of plants by treatment of their root portions.

Another object of my invention is the provision of a rugged, durable device for the above purpose at a minimum cost.

Another object of my invention is the provision of a tubular device with telescoping upper and lower members; which is shaped much like an ordinary walking cane; that has an injector needle projecting from its lower end; and which has mechanism concealed within it for positively injecting a predetermined amount of liquid into the roots of plants by pressing downward on the upper section after the needle has been inserted into the roots.

Another object of my invention is the provision of an annular knife-like member at the base of the tubular body which may be used to cut off the weed projecting above the ground at the same time that the injector needle is being inserted into the roots.

The details of the preferred embodiment and various other objects and advantages inherent in its construction will be made clear by the following detailed description and the attached drawing.

Referring to the drawing, wherein like characters indicate like parts throughout the several views:

Fig. 1 is a side elevation of my novel device, some parts being broken away and shown in section;

Fig. 2 is an enlarged vertical axial section of the lower portion of the injector, some parts being shown in full; and Fig. 3 is a section taken on the line 3—3 of Fig. 2.

Numeral 1 indicates the tubular body portion of my novel root injector. Tubular body 1 is made up of telescoping upper and lower members 2 and 3, respectively. Snugly fitted over the upper body portion 2 is a horizontally extending handle 4, having an end receiving cap 5, which is tightened around the top thereof by means of thumb nut 6 attached to a bifurcated or split flange member 7.

The numeral 1 indicates a preferably tubular body portion of my novel structure, as an entirety, made up of an upper elongated tubular shank 2 and a lower tubular member in the form of a guide sleeve 3. A horizontally extending handle 4 is secured to the top end of shank 2. Handle 4 is shown as having a receiving cap 5, which is tightened around the top end of shank 2 by means of a screw and thumb nut arrangement 6 which extends through a bifurcated flange member 7.

Mounted fast on the lower end of shank portion 2 is a head 8 which is cylindrical in cross section and which is slidably mounted in sleeve 3 for up and down movements. The upper end of head 8 is shown as having a reduced portion 9 which fits snugly up into the lower end of tubular shank 2. Upper portion of head 8 is also shown as being chambered out at 10 so as to provide, together with the lower portion of tubular chamber 2, a fluid reservoir which may be filled by removal of the handle 4.

As will be seen by referring to Fig. 1, guide sleeve 3 is provided with a longitudinally elongated slot 11 through which projects a stop screw 12a which is in turn secured to the head 8. Base plug 12, preferably shown as having a downwardly projecting annular knife-like member 13 extending around its periphery, is secured by sweating or other suitable means to the lower end of guide sleeve 3.

In the space 15, between the lower portion of head 8 and the base plug 12, is interposed a coil spring 14, under tension. The space 15 is vented to the atmosphere by an aperture 16. Head 8, which is merely an extension of shank 2, is provided with a longitudinally extending centrally located cylinder bore 17 opening through its lower end.

A tubular injector needle 39 is held fast at its intermediate portion to base plug 12 at 38 so that one end thereof projects downwardly and the upper end projects upwardly from base plug 12 and into the cylinder bore 17. As will be observed, the upwardly projecting end of needle 39 fits snugly in cylinder bore 17 and has a closed upper end. These characteristics make the upper end of injector needle 39 act as a piston in the bore 17.

Tubular needle 39 has a pointed end 40 on its downwardly projecting portion. The internal longitudinal passage 41 extends from a plurality of laterally extending apertures 43 near the point 40 to a longitudinally elongated port 42 opening laterally against the wall of cylinder bore 17. It will be noted that port 42 is of a length not less than the length of the stroke of the upper piston acting end of injector needle 39 in the bore 17. As has been pointed out above, the length of this stroke is determined by the length of the longitudinal slot 11 in guide sleeve 3 in which stop pin 12a moves.

Vertical bore 21 provides a passage way between reservoir 10 and a laterally extending passage 18 in the upper end of head 8. It will be observed that passage 18 has been made by boring diametrically through the head 8 and plugging the opposite ends thereof at 19. Axial bore 17 communicates with transverse or laterally extending bore 18 at its center.

A vertical bore 20, laterally spaced with respect to axial bore 17, and of enlarged diameter with respect to bore 21, extends upwardly from the bottom of head 8 until it communicates with transverse passage 18. Vertical passages 21 and 20, however, are concentrically aligned. A one way opening check valve 26 having a conical end 27, is mounted for reciprocal movements in bore 20. Because of the concentric arrangement of vertical bores 20 and 21, conical point 27 makes a liquid tight seal on the seat 28 of the reduced bore 21. A coil spring 29 is inserted in bore 20 between the lower end of valve 26 and a set screw 30. Set screw 30 is provided with an axial passage 36 to allow the entrance and exit of air as the valve 26 reciprocates in the bore 20.

A vertical bore 25 extends downwardly from transverse passage 18, on the side of head 8 diametrically opposite vertical passage 21, and communicates with a lateral passage way 23 which extends inwardly and communicates with the cylinder bore 17 within an area exposed to the elongated port 42 situated in the piston acting upper end of injector needle 39. In practice the laterally extending passage 23 is made by boring inwardly from the peripheral edge of head 8, and thereafter inserting a plug at 24 to seal the outer end. A bore 22 extends upwardly from the bottom of head 8 in communication with the laterally extending passage 23. Again it will be observed that while vertical passage ways or bores 22 and 25 are concentrically disposed with respect to each other, bore 22 is enlarged with respect to bore 25. Mounted in bore 25 for reciprocating movements is a cylindrical valve 31 having a conical end portion 32 which makes a liquid tight seal on the lower edge 33 of reduced bore 25. Coil spring 34 is inserted between the bottom of valve 31 and a set screw 35 in the bottom end of bore 22. Set screw 35 is axially bored at 37 to provide an air passage therethrough to facilitate the reciprocal movements of cylindrical valve 31.

In accordance with the patent statutes I have disclosed a complete machine or device for the purposes had in view, but it will be understood that the same is capable of various modifications all within the scope of the invention herein disclosed and broadly claimed.

What I claim is:

1. In a device of the kind described, an elongated shank, a guide sleeve telescopically applied over the lower end of said shank for reciprocating movements with respect thereto and projecting outwardly thereof, stop means limiting the extent of reciprocating movements of said sleeve with respect to said shank, said sleeve being substantially closed at its bottom, the lower end portion of said shank being provided with a longitudinally extending cylinder bore opening through its lower end, a tubular piston acting plunger mounted fast on the closed end of said sleeve and projecting upwardly therefrom into the cylinder bore, a tubular injector needle also mounted fast on the closed end of said sleeve and forming an extension of said tubular plunger, said tubular plunger being closed at its upper end and being provided within the cylinder bore with a longitudinally elonagted port opening laterally from the interior thereof against the wall of the cylinder bore and being of a length not less than the length of the stroke of the plunger, said shank being chambered to provide a fluid reservoir above the cylinder bore, said shank being provided with a fluid passage extending from the reservoir thereof and opening laterally into the cylinder bore thereof within the area exposed to the elongated port of the plunger, the upper end portion of said cylinder bore being in communication with the intermediate portion of said fluid passage, one way opening check valves located in said fluid passage at opposite sides of its point of communication with the upper end of said cylinder bore, said check valves being yieldingly biased toward closed positions in directions to prevent upward flow of fluid therethrough to the reservoir but to permit downward flow of fluid from the reservoir, and yielding means biasing the sleeve and plunger to move to their outer extreme positions.

2. In a device of the kind described, an elongated shank, a guide sleeve telescopically applied over the lower end of said shank for reciprocating movements with respect thereto and projecting outwardly thereof, stop means limiting the extent of reciprocating movements of said sleeve with respect to said shank, said sleeve being substantially closed at its bottom, the lower end portion of said shank being provided with a longitudinally extending cylinder bore opening through its lower end, a tubular piston acting plunger mounted fast on the closed end of said sleeve and projecting upwardly therefrom into the cylinder bore, a tubular injector needle also mounted fast on the closed end of said sleeve and forming an extension of said tubular plunger, said tubular plunger being closed at its upper end and being provided within the cylinder bore with a longitudinally elongated port opening laterally from the interior thereof against the wall of the cylinder bore and being of a length not less than the length of the stroke of the plunger, said shank being chambered to provide a fluid reservoir above the cylinder bore, said shank being provided with a fluid passage extending from the reservoir thereof and opening laterally into the cylinder bore thereof within the area exposed to the elongated port of the plunger, the upper end portion of said cylinder bore being in communication with the intermediate portion of said fluid passage, one way opening check valves located in said fluid passage at opposite sides of its point of communication with the upper end of said cylinder bore, said check valves being yieldingly biased toward closed positions in directions to prevent upward flow of fluid therethrough to the reservoir but to permit downward flow of fluid from the reservoir, and a compression spring disposed within the projecting lower end portion of the guide sleeve and compressed between the substantially closed end thereof and the lower end of the plunger.

HAVEN KENNISON.